(12) United States Patent
Atarius et al.

(10) Patent No.: US 7,184,462 B1
(45) Date of Patent: Feb. 27, 2007

(54) METHOD AND APPARATUS FOR CONFIGURING A RAKE RECEIVER (75) Inventors: Roozbeh Atarius, Lund (SE); Torsten J. Carlsson, Lund (SE); Håkan B. Eriksson, Lund (SE); Kjell B. Gustafsson, Lund (SE); Torgny Palenius, Löddeköpinge (SE); Christer Östberg, Staffanstorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 883 days.

(21) Appl. No.: 09/204,370

(22) Filed: Dec. 4, 1998

(51) Int. Cl.
*H04B 1/00* (2006.01)
(52) U.S. Cl. .................. 375/148; 375/150; 375/152
(58) Field of Classification Search ................ 375/147, 375/148, 149, 150, 152, 316
See application file for complete search history.

(56) References Cited

U.S. PATENT DOCUMENTS

| 5,799,256 | A | * | 8/1998 | Pombo et al. ............... 455/574 |
| 5,987,012 | A | * | 11/1999 | Bruckert et al. ............ 370/331 |
| 5,987,016 | A | * | 11/1999 | He .............................. 370/335 |
| 6,072,807 | A | * | 6/2000 | Daudelin ..................... 370/465 |
| 6,125,137 | A | * | 9/2000 | Wang et al. ................. 375/148 |
| 6,222,834 | B1 | * | 4/2001 | Kondo ......................... 370/342 |
| 6,269,075 | B1 | * | 7/2001 | Tran ............................ 370/206 |
| 6,456,827 | B1 | * | 9/2002 | Kubo et al. ................... 455/68 |

FOREIGN PATENT DOCUMENTS

| EP | 0 690 588 | 1/1996 |
| EP | 0 825 727 | 2/1998 |
| EP | 0 853 389 | 7/1998 |
| EP | 0 858 175 | 8/1998 |
| GB | 2 318 952 | 5/1998 |
| JP | 10164011 A | * | 6/1998 |

* cited by examiner

*Primary Examiner*—Jay K. Patel
*Assistant Examiner*—David B. Lugo
(74) *Attorney, Agent, or Firm*—Potomac Patent Group PLLC (57) ABSTRACT A searcher uses an input signal, and for example, a matched filter to generate a first set of candidate paths. A selector uses the input signal and the first set of candidate paths to generate a second set of paths. The second set of paths is used to configure the fingers of a RAKE receiver. According to one aspect of the invention, the first set of candidate paths contains M paths, and the second stage uses M correlators to generate a set of M correlation values. The second stage uses the M correlation values to select N paths that are used to configure the N fingers of the RAKE receiver. According to another aspect of the invention, the first set of candidate paths contains M paths, and the second stage uses a multiple of M correlators to track the M paths and generate a set of M estimates. The second stage uses the M estimates to select N paths that are used to configure the N fingers of the RAKE receiver. According to another aspect of the invention, the selector can generate new sets of N paths while the searcher is either active or inactive. The receiver can use a quality signal or a counter to notify the searcher and/or the selector to generate new sets of paths. The selector decreases the need to continuously run the matched filter. The receiver can re-configure the fingers without having to search for new paths. The receiver can also find paths that are uncorrelated and less susceptible to fading.

13 Claims, 6 Drawing Sheets

METHOD AND APPARATUS FOR CONFIGURING A RAKE RECEIVER

BACKGROUND

The invention relates to receiving spread spectrum radio signals, such as digitally modulated signals in a Code Division Multiple Access (CDMA) mobile radio telephone system, and more particularly, to configuring a RAKE receiver.

In a conventional RAKE receiver, a searcher provides a set of paths to the fingers and diversity combiner of the RAKE receiver. The searcher uses a matched filter (or a similar correlation scheme) to select N paths, where N is the number of fingers. The diversity combiner then allots different weights to each of the N fingers.

Generally speaking, new paths are born and other paths die as a mobile station moves through its environment. If two or more paths die together, it is difficult for the receiver to get enough signal power. As the correlated paths die, it is usually necessary to use the searcher (or matched filter) to find new paths. In some cases, the RAKE receiver has to run the matched filter continuously. Using a matched filter is costly and computationally complex. It is not only time-consuming; it also decreases the battery life of hand-held units.

Figure 1:
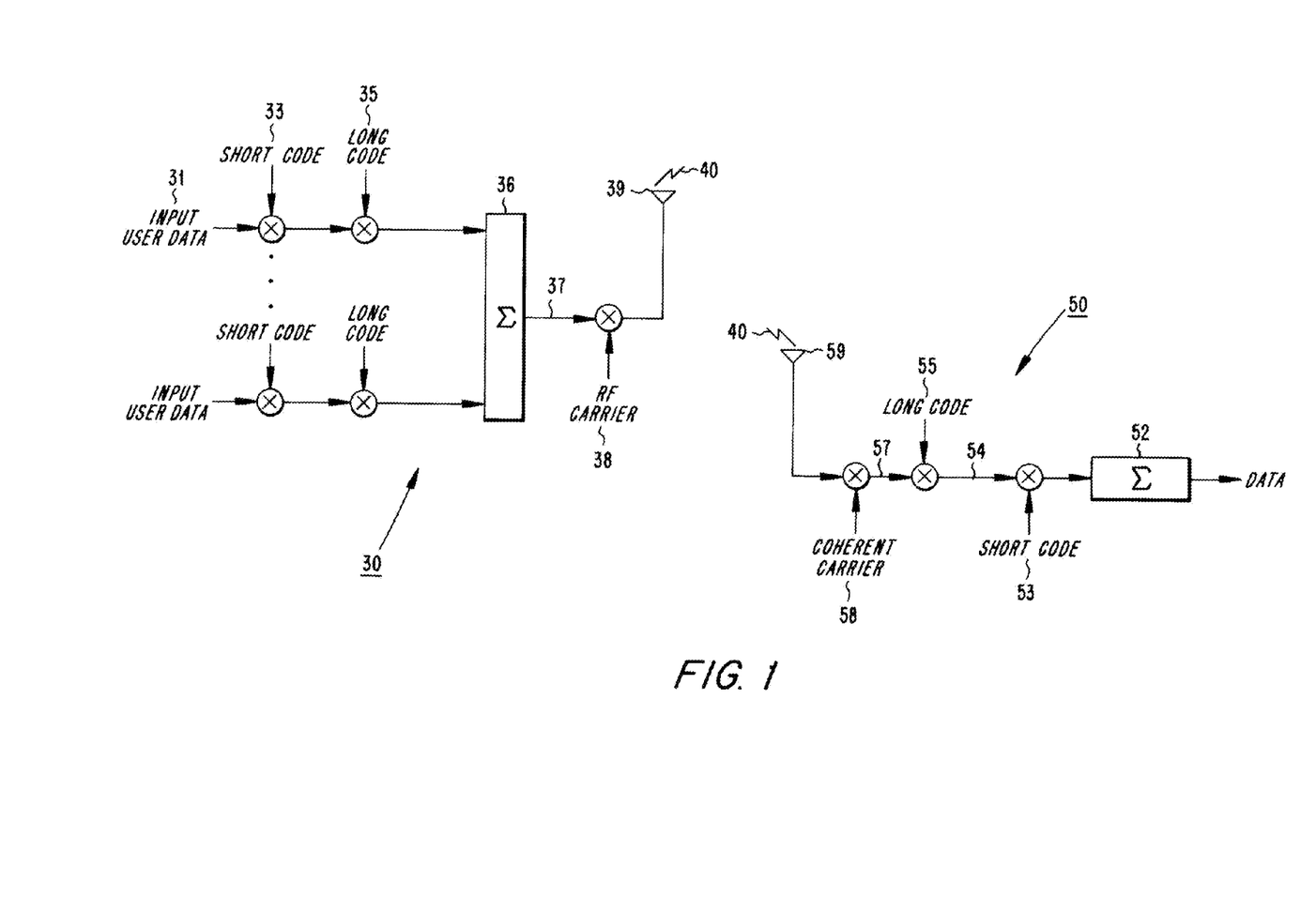
FIG. 1 is a schematic diagram of an example of a CDMA system.

FIG. 1 is a schematic diagram of an example of a CDMA system. A transmitter 30 can transmit input user data to multiple users. In a traditional CDMA system, each symbol of input user data 31 is multiplied by a short code or chip sequence 33. There is a unique short code for each input user. Input user data is then spread by a long code or chip sequence 35. While the short codes eliminate multiple access interference among users in the same cell, the long code is used to eliminate multiple access interference among the transmitters. An accumulator 36 adds the spread signals to form a composite signal 37. Composite signal 37 is used to modulate a radio frequency carrier 38 which is transmitted by a transmitting antenna 39.

A receiver 50 has a receiving antenna 59 for receiving signal 40. Receiver 50 uses a carrier signal 58 to demodulate signal 40 and to obtain composite signal 57. Composite signal 57 is multiplied by a synchronized long code or chip sequence 55. Long code 55 is a locally generated complex conjugated replica of long code 35.

The despread signal 54 is then multiplied by a synchronized short code or chip sequence. Short code 53 is a locally generated complex conjugated replica of short code 33 (or one of the other N short codes used by transmitter 30). The multiplication by short code 53 suppresses the interference due to transmission to the other users. A digital logic circuit 52 (e.g., a summation and dump unit) can be used to provide an estimate of input user data 31.

It will be evident to those skilled in the art that receiver 50 can not reconstruct input user data 31 unless it can (1) determine long code 35 and synchronize a locally generated complex conjugated replica of long code 35 with the received signal 57, and (2) determine short code 33 and synchronize a locally generated complex conjugated replica of short code 33 with the despread signal 54. It is for this reason that many CDMA signals contain a pilot signal or a periodic code (synchronization code). The synchronization codes can be found by using a matched filter or a correlation scheme and by identifying the correlation peaks.

In mobile communication systems, signals transmitted between base and mobile stations typically suffer from echo distortion or time dispersion (multipath delay). Multipath delay is caused by, for example, signal reflections from large buildings or nearby mountain ranges. The obstructions cause the signal to proceed to the receiver along not one, but many paths. The receiver receives a composite signal of multiple versions of the transmitted signal that have propagated along different paths (referred to as "rays"). The rays have different and randomly varying delays and amplitudes.

Each distinguishable "ray" has a certain relative time of arrival, $T_n$ seconds. A receiver can determine the relative time of arrival of each ray by using a matched filter, a shifted search finger, or another correlation scheme. The output of the matched filter or the correlation scheme is usually referred to as the multipath profile (or the delay profile). Because the received signal contains multiple versions of the same signal, the delay profile contains more than one spike.

Figure 2:
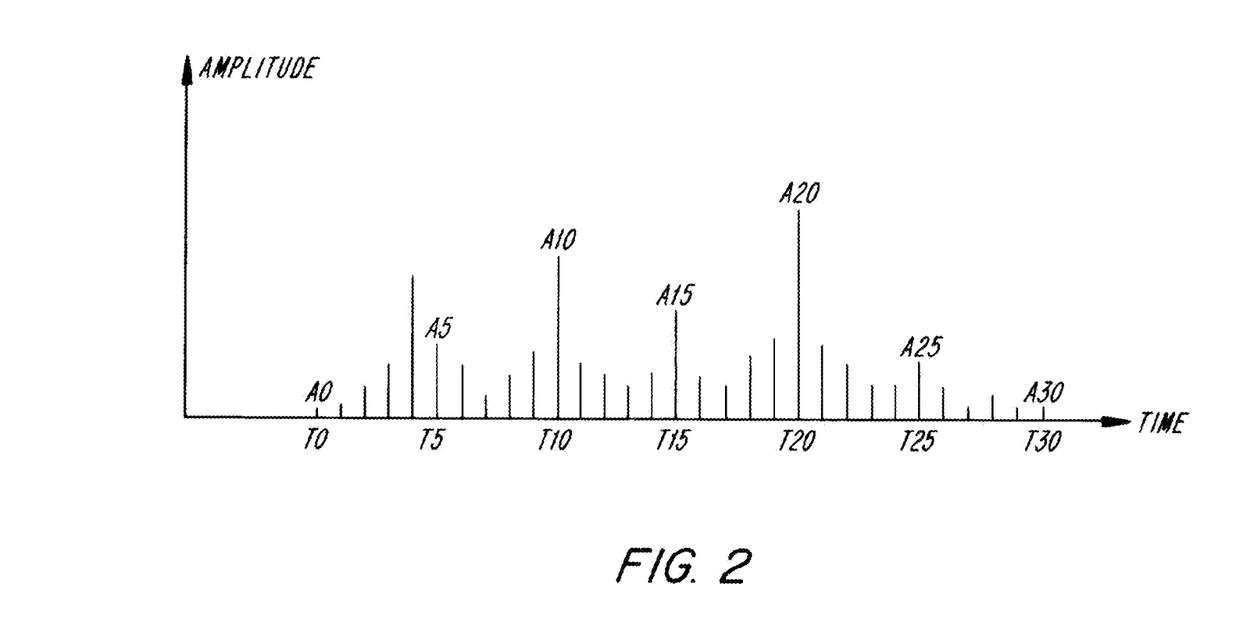
FIG. 2 is an example of a multipath profile.

FIG. 2 is an example of a multipath profile. The ray that propagates along the shortest path arrives at time $T_o$ with amplitude $A_0$ and phase $\phi_0$, and rays propagating along longer paths arrive at times $T_1, T_2, \ldots, T_{30}$ with amplitudes $A_1, A_2, \ldots, A_{30}$ and phase $\phi_1, \phi_2 \ldots, \phi_{30}$, respectively. In order to optimally detect the transmitted signal, the spikes must be combined in an appropriate way. This is usually done by a RAKE receiver, which is so named because it "rakes" different paths together. A RAKE receiver uses a form of diversity combining to collect the signal energy from the various received signal paths (or rays). The term "diversity" refers to the fact that a RAKE receiver uses redundant communication channels so that when some channels fade, communication is still possible over non-fading channels. A CDMA RAKE receiver combats fading by identifying the delay for each path individually and then adding them together coherently.

Figure 3:
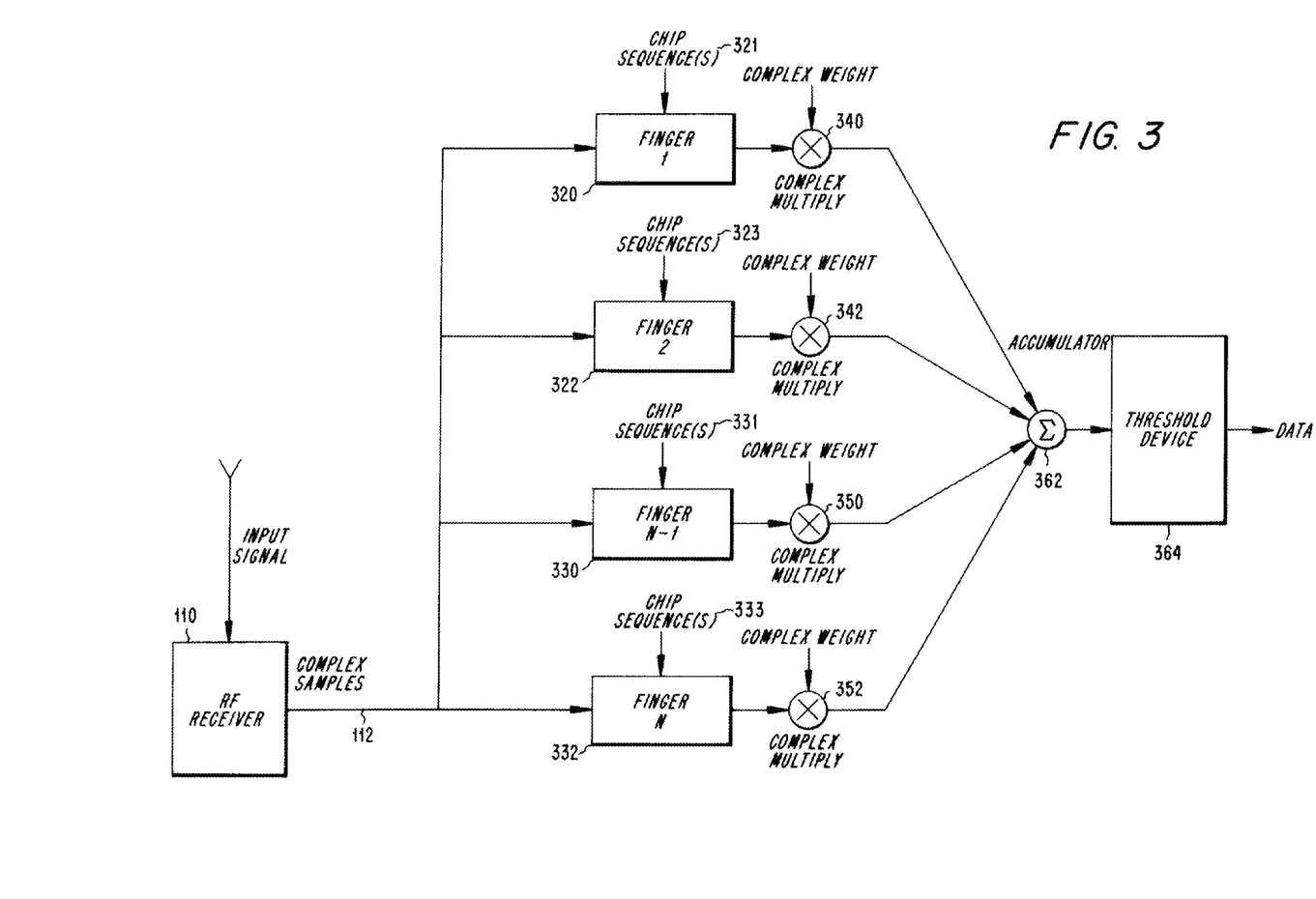
FIG. 3 is a schematic diagram of a RAKE receiver with N fingers.

FIG. 3 is a schematic diagram of a RAKE receiver with N fingers. A radio frequency (RF) receiver 110 demodulates a received signal and quantizes the demodulated signal to provide input signal 112. Each finger uses input signal 112 to recover signal power from a different path. The receiver can use a searcher to find a set of signal paths.

Using the example in FIG. 2, the searcher determines that the peak at $T_{20}$ has the greatest amplitude. Because this path is the strongest path, one of the fingers, for example, finger 320 is configured to receive a path having a delay of $T_{20}$. The receiver can be configured by, for example, delaying digital samples 112 by $T_{20}$ or by shifting chip sequence(s) 321 by an equivalent amount.

Similarly, input signal 112 can be correlated in finger 322 with a chip sequence 323 that has a phase corresponding to $T_{10}$; in finger 330 with a chip sequence 331 that has a phase corresponding to $T_5$; and in finger 332 with chip sequence(s) 333 having a phase corresponding to $T_{15}$. The finger outputs are multiplied by individual weights 340, 342, 350, and 352 to maximize the received signal-to-noise-and-interference ratio. The weighted outputs are then added by an accumulator 362. The output of the accumulator 362 is fed to a threshold device 364, or to a quantizer that outputs soft information.

It is important that the RAKE receiver use the best set of paths. However, using a matched filter to search for new paths is costly and computationally complex. There is a need for a diversity scheme that can reduce the computational complexity of the RAKE receiver.

SUMMARY

These and other drawbacks, problems, and limitations of conventional RAKE receivers are overcome by generating a second set of paths from a first set of candidate paths. A first stage uses an input signal to find a first set of candidate paths; a second stage uses the input signal and the first set of candidate paths to generate a second set of paths; and a third stage uses the second set of paths to configure the RAKE receiver.

According to an exemplary embodiment of the invention, the first stage comprises a matched filter, the second stage comprises a bank of search fingers or correlators, and the third stage comprises a diversity combiner.

According to one aspect of the invention, the first stage finds a first set of M candidate paths, and the second stage uses the M candidate paths to select N paths that are used to configure the N fingers of the RAKE receiver.

According to another aspect of the invention, the first stage finds a first set of M candidate paths, and the second stage tracks the M paths in order to select or generate N paths that are used to configure the N fingers of the RAKE receiver.

According to another aspect of the invention, the second stage can generate new sets of N paths while the first stage is either active or inactive. The third stage can use a quality signal or a counter to notify the first stage and/or the second stage to generate new sets of paths.

One advantage of the invention is that it is not necessary to continuously run a matched filter. Another advantage is that the receiver can re-configure the fingers without having to search for new paths. Another advantage is that the receiver can use paths that are uncorrelated and less susceptible to fading.

BRIEF DESCRIPTION OF THE DRAWINGS

The foregoing, and other objects, features, and advantages of the invention will be more readily understood upon reading the following detailed description in conjunction with the drawings in which.

DETAILED DESCRIPTION

In the following description, specific details such as particular names for circuits, circuit components, and transmission techniques are discussed in order to provide a better understanding of the invention. However, it will be apparent to those skilled in the art that the invention can be practiced in other embodiments that depart from these specific details. In other instances, detailed descriptions of well-known methods and circuits are omitted so as not to obscure the description of the invention with unnecessary detail.

As discussed above, FIG. 1 is a schematic diagram of an example of a CDMA system; FIG. 2 is an example of a multipath profile; and FIG. 3 is a schematic diagram of a RAKE receiver with N fingers.

Figure 4:
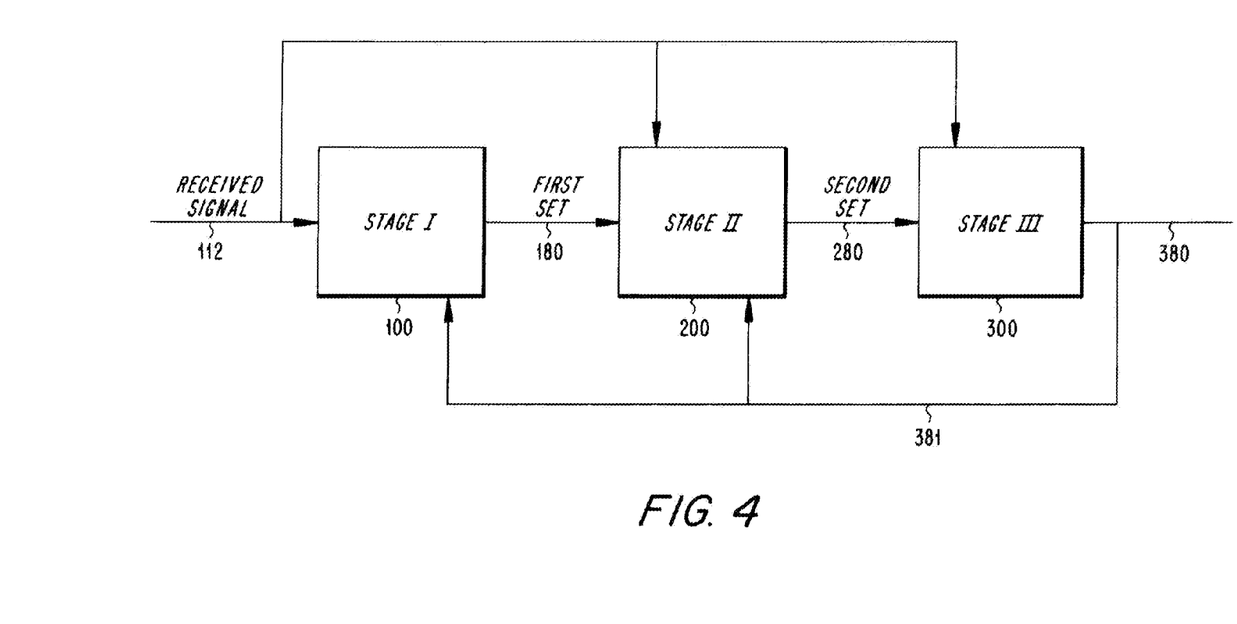
FIG. 4 is a schematic diagram of a RAKE receiver and a second stage that selects or generates a second set of paths.

FIG. 4 is a schematic diagram of a RAKE receiver and a second stage that selects or generates a second set of paths. A first stage 100 uses digital samples 112 to find a first set of candidate paths 180. The first stage can use a matched filter and a peak detector to find the first set of paths 180. However, unlike the searcher described above, the first stage 100 finds M paths, where M is greater than N, the number of fingers.

The second stage 200 uses digital samples 112 and the first set of candidate paths 180 to select a second set of paths 280. The third stage 300 uses the second set of paths 280 to configure the N fingers of the RAKE receiver. It is not possible to simply use the first set of candidate paths 180 to configure the N fingers because the first set 180 contains more than N paths. The third stage 300 uses the digital samples 112, the second set of paths 280, a diversity combiner, and a decoder to recreate an estimate of the transmitted signal.

The second stage 200 decreases the need for the first stage. When the receiver or the transmitter moves (or objects between the receiver and the transmitter move), some paths fade and some paths get stronger. The second stage can watch the M paths and select the N best paths as needed. In other words, the second stage 200 can re-configure the RAKE receiver by replacing one of the N paths with one of the (M–N) other paths. A path that was one of the M best paths, but not one of the N best paths can become one of the N best paths. If the second stage determines that the N paths are correlated, the second stage 200 can replace the correlated paths with uncorrelated paths, and if needed, switch them back.

There are many different ways for the second stage 200 to use the first set of candidate paths 180 to generate the second set of paths 280. One way is to use a bank of M correlators, and to assign each correlator to one of the M paths. Each correlator can use a chip sequence with a different phase (or offset). The M correlators can generate a set of M correlation values. As the receiver or the transmitter moves, the receiver can use the M correlators to determine the N best paths. If the second stage 200 determines that there is a new group of best paths, the second stage 200 can reconfigure the third stage 300 accordingly. The second stage 200 can quickly and easily generate a new sets of paths 280. Because the second stage searches only M paths, it is easier for the second stage 200 to find a new subset of paths. Because the second stage 200 can watch digital samples 112 and the M paths and generate new sets of paths as needed, the second stage 200 can reduce the receiver's reliance on a matched filter and/or other costly computations.

According to one aspect of the invention, the second stage 200 merely watches the M paths and selects N best paths. According to another aspect of the invention, the second stage 200 actually tracks the M paths. The second stage 200 generates M estimates and selects N paths from the M estimates. The second stage 200 can use a bank of kM correlators to track the M paths. If, for example, the second stage 200 uses a bank of 3*M correlators, the second stage 200 can allot three correlators to each of the M paths, and set the first correlator to the current time delay, the second correlator a little ahead of the current time delay, and the third correlator a little behind the current time delay. Or similarly, the second stage 200 can use a bank 5*M correlators, and set two correlators ahead of the current time delay and two correlators behind the current delay. Or alternatively, the second stage 200 can use two correlators and interpolate between the two correlators.

As mentioned above, the second stage 200 reduces the need to use a matched filter; it does not necessarily eliminate it. In emergency situations, when the receiver determines that the signal quality is decreasing, the receiver can simultaneously ask the second stage 200 to send the third stage 300 the best set of paths it has, and ask the first stage 100 to generate a new set of candidate paths 180. Or alternatively, the receiver can use a signal 381 to continuously update the first stage 100 and the second stage 200 of the quality of output signal 380. In some systems, it is advantageous to periodically generate new sets of candidate paths irregardless of the output signal 380. In these systems, the receiver can use a counter to keep track of how long it has been since the matched filter last generated a set of candidate paths. Again, the second stage 200 can continue to generate sets of paths, while the first stage 100 generates a new set of candidate paths 180.

Figure 5:
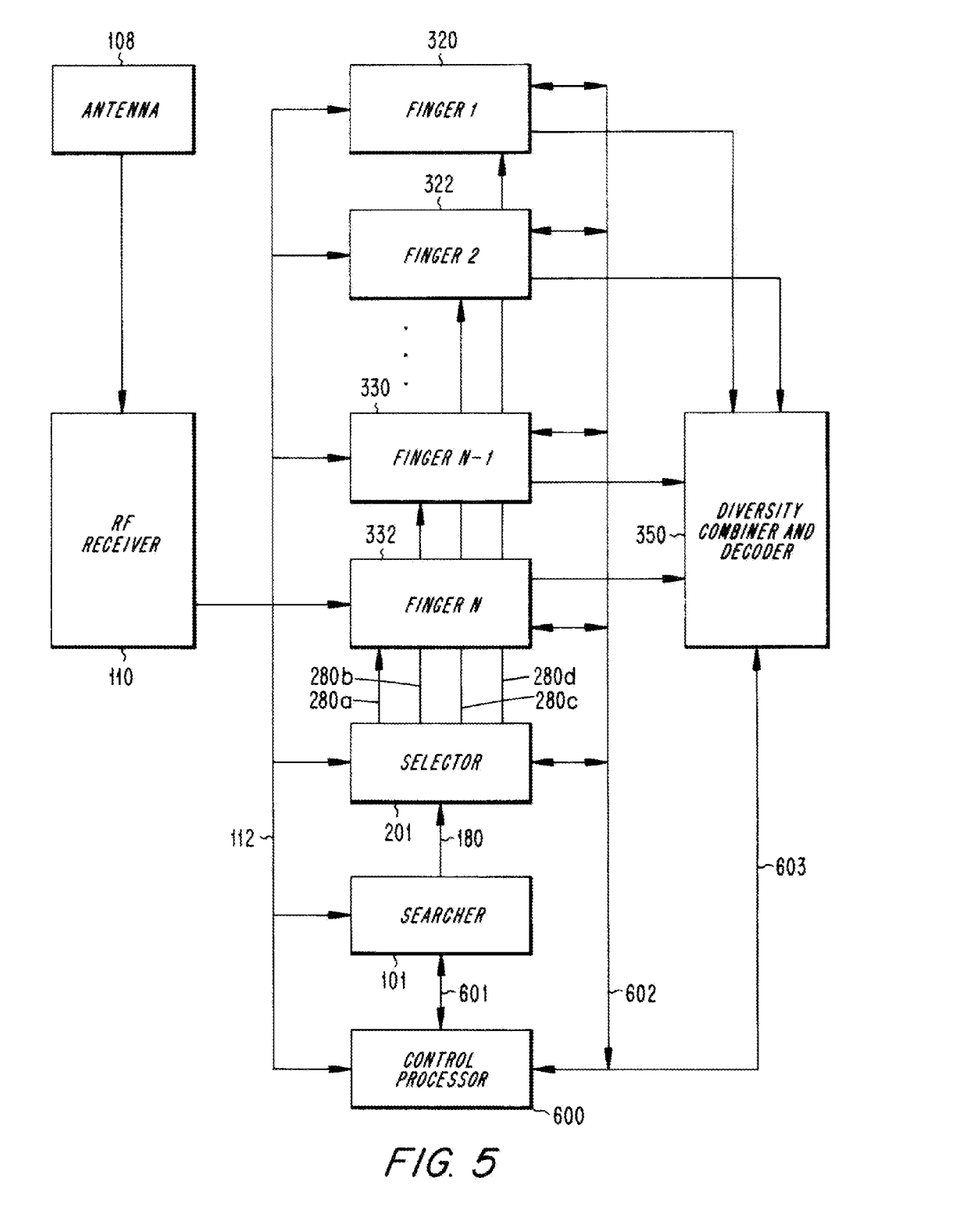
FIG. 5 is another schematic drawing of a RAKE receiver and a second stage that selects or generates a second set of paths; and, FIG. 6 is a flow chart of a method for decreasing the need for a matched filter.

FIG. 5 is another schematic drawing of a RAKE receiver and a second stage that selects or generates a second set of paths. An antenna 108 and a RF receiver 110 provide digital samples 112 to fingers 320, 322, 330, and 332. Antenna 108 and RF receiver 110 also provide digital samples to a searcher 101, a selector 201, and a control processor 600. The control processor 600 can instruct searcher 101 via path 601 to use digital samples 112 to find a set of candidate paths 180.

The selector 201 uses the set of candidate paths 180 to select a smaller set or a subset of paths 280. If, for example, the RAKE receiver has four fingers, the second set of paths 280 contains four paths: 280*a*, 280*b*, 280*c*, and 280*d*. The first path 280*a* is used to configure finger 332; the second path 280*b* is used to configure finger 330; the third path 280*c* is used to configure finger 322; and the fourth path 280*d* is used to configure finger 320. The selector 201 uses digital samples 112 and the first set of candidate paths 180 to select new paths. The diversity combiner and decoder 350 use the outputs of the four fingers to recreate an estimate of the transmitted signal. The control processor 600 monitors the quality of the estimate via path 603 and uses this information to control the searcher 101 and the selector 201 via paths 601 and 602.

Figure 6:
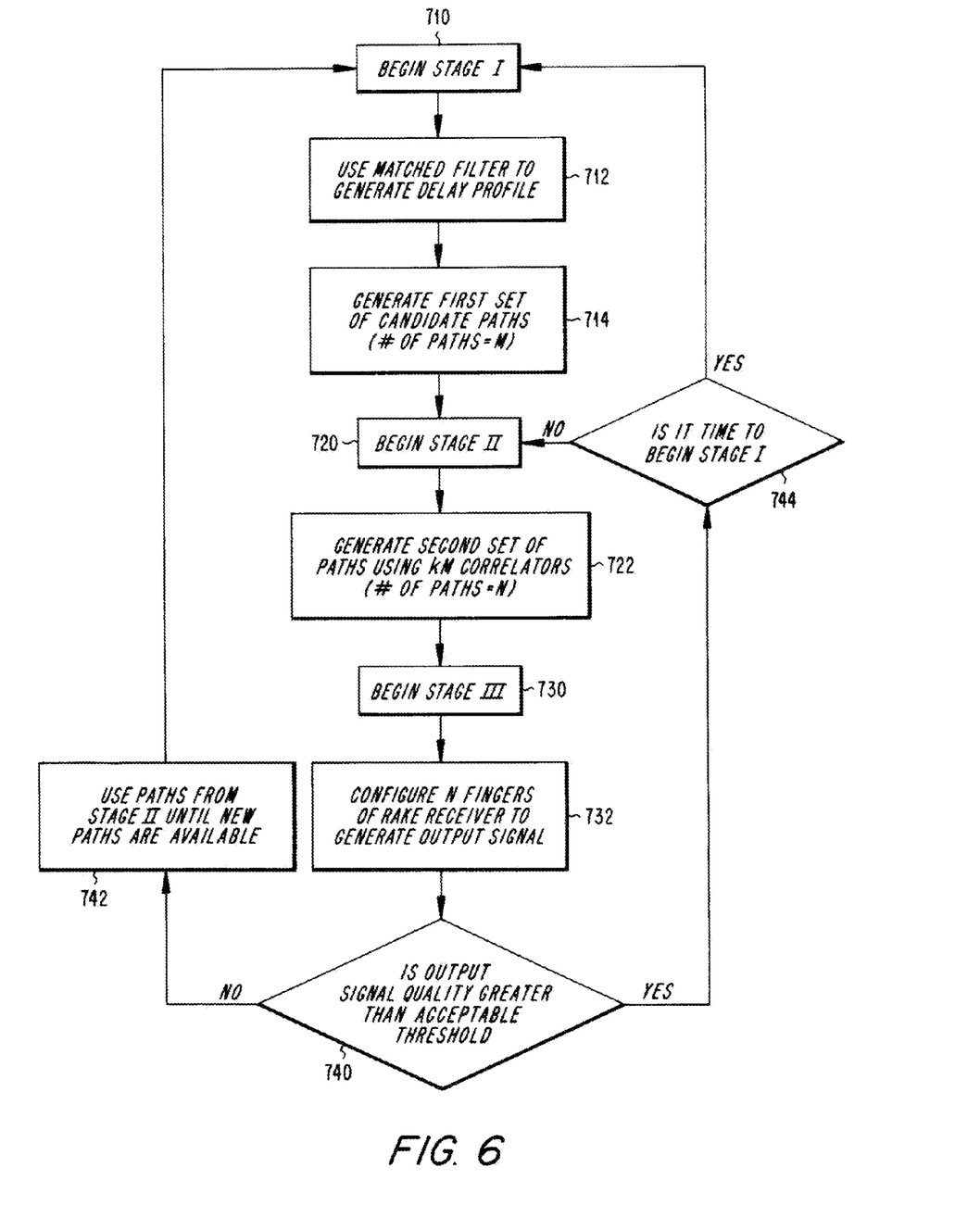

FIG. 6 is a flow chart of a method for decreasing the need for a matched filter. In step 710, the RAKE receiver begins stage one. In step 712, the RAKE receiver uses a matched filter to generate a delay profile. In step 714, the RAKE receiver uses the delay profile to generate a first set of candidate paths that contains M possible paths.

In step 720, the RAKE receiver begins stage two. In step 722, the RAKE receiver uses the first set of candidate paths to generate a second set of paths that contains N paths. The RAKE receiver can use kM correlators to find the N paths.

In step 730, the RAKE receiver begins stage three. In step 732, the RAKE receiver uses the second set of paths to configure the N fingers of the RAKE receiver.

In step 740, the RAKE receiver checks the quality of the output signal. If the quality of the output signal exceeds an acceptable level, it is not necessary to generate a new first set of candidate paths. If, however, the quality of the output signal is less than an acceptable level, the receiver can generate a new set of candidate paths using stage one. In step 742, the receiver instructs stage three to use paths from stage two until new paths are ready from stage one. In some systems, it is advantageous to periodically look for new candidate paths. In step 744, the receiver checks a counter or another device to see if it is time to look for new paths. If the counter has exceeded a pre-set time limit, the receiver initiates stage one; if not, the receiver continues to use paths selected by or generated by stage two.

While the foregoing description makes reference to particular illustrative embodiments, these examples should not be construed as limitations. Not only can the inventive system be modified for other transmission techniques; it can also be modified for other cellular systems. Thus, the present invention is not limited to the disclosed embodiments, but is to be accorded the widest scope consistent with the claims below.

What is claimed is:

1. A RAKE receiver with N fingers, the RAKE receiver comprising:
   a first stage, the first stage configured to use an input signal to find a set of more than N paths;
   a second stage, the second stage configured to use the first set of more than N paths, the input signal and a quality signal from the RAKE receiver to generate a set of N paths, the second stage generates the set of N paths more frequently than the first stage generates the set of more than N paths; and
   a third stage, the third stage configured to use the set of N paths to configure the N fingers of the RAKE receiver,
   wherein:
   the first stage is configured to use an output of a matched filter to generate the first set of more than N paths; and
   the second stage is configured to generate a new set of N paths while the first stage is inactive.

2. A RAKE receiver comprising:
   means for receiving an input signal;
   a searcher, the searcher configured to use the input signal to find a set of candidate paths; and,
   a selector, the selector configured to use the input signal, the set of candidate paths and a quality signal from the RAKE receiver to select a subset of candidate paths that are used to configure the RAKE receiver, the selector configured to generate a new subset of paths while the searcher is inactive.

3. A RAKE receiver as described in claim 2, the searcher configured to use the input signal to find a set of M candidate paths, the selector comprising M correlators, the selector configured to use the outputs of the M correlators to generate the subset of candidate paths.

4. A RAKE receiver as described in claim 2, the searcher configured to use an output of a matched filter to generate the set of candidate paths.

5. A RAKE receiver as described in claim 4, the selector configured to generate a new subset of paths while the searcher is active generating a new set of candidate paths.

6. A RAKE receiver comprising:
   means for receiving an input signal;
   a searcher, the searcher configured to use the input signal to find a set of candidate paths, the set of candidate paths containing M paths; and
   a selector, the selector configured to use the input signal, the set of candidate paths and a quality signal from the RAKE receiver to select a smaller set of candidate paths, the selector comprising k*M correlators, wherein K correlators are assigned to each of the selected paths, and the selector configured to use k*M correlators to generate M estimates.

7. A RAKE receiver as described in claim 6, the selector configured to use the M estimates to generate the smaller set of candidate paths.

8. A method for configuring a RAKE receiver, the method comprising the steps of:
   finding a first set of paths;
   searching the first set of paths to generate a first set of correlation values;

selecting a second set of paths from the first set of paths based on a second set of correlation values and a quality signal from the RAKE receiver; and updating the second set of paths without updating the first set of paths.

9. A method as described in claim 8, further comprising the step of updating the second set of paths while updating the first set of paths.

10. A method as described in claim 8, wherein the step of selecting the second set of paths further comprises tracking the first set of paths.

11. A method for configuring a RAKE receiver, the method comprising the steps of:

receiving an input signal;

finding a first set of paths;

searching the first set of paths to generate a set of correlation values;

selecting a second set of paths from the first set of paths based on the correlation values, the input signal and a quality signal from the RAKE receiver; and updating the second set of paths without updating the first set of paths.

12. A method as described in claim 11, further comprising the step of updating the second set of paths while updating the first set of paths.

13. A method as described in claim 11, wherein the step of selecting the second set of paths further comprises tracking the first set of paths.

\* \* \* \* \*